United States Patent [19]

Miura et al.

[11] Patent Number: 4,798,393

[45] Date of Patent: Jan. 17, 1989

[54] RIDER-CONTROLLED WORKING MACHINE WITH FOUR-WHEEL STEERING SYSTEM

[75] Inventors: Tatsuhiko Miura; Hiroshi Uno, both of Saitama, Japan

[73] Assignee: Honda Giken Kogyo Kabushiki Kaisha, Tokyo, Japan

[21] Appl. No.: 63,700

[22] Filed: Jun. 12, 1987

Related U.S. Application Data

[63] Continuation-in-part of Ser. No. 767,861, Aug. 21, 1985, Pat. No. 4,613,009, and a continuation of Ser. No. 811,727, Dec. 20, 1985, abandoned.

[30] Foreign Application Priority Data

| Dec. 20, 1984 | [JP] | Japan | 59-268786 |
| Dec. 20, 1984 | [JP] | Japan | 59-268787 |
| Dec. 20, 1984 | [JP] | Japan | 59-268788 |
| Dec. 20, 1984 | [JP] | Japan | 59-193381[U] |
| Dec. 20, 1984 | [JP] | Japan | 59-193382[U] |
| Dec. 20, 1984 | [JP] | Japan | 59-193383[U] |

[51] Int. Cl.$^4$ .............................................. B62D 3/02
[52] U.S. Cl. .................................. 280/91; 180/900
[58] Field of Search ................... 280/91, 98, 99, 103; 180/237, 900; 172/799, 278, 292, 190, 23, 26

[56] References Cited

U.S. PATENT DOCUMENTS

| 2,058,964 | 1/1936 | Dufour | 180/900 |
| 2,904,910 | 9/1959 | Armington | 172/292 |
| 3,055,675 | 9/1962 | Brecko et al. | 280/91 |
| 3,596,730 | 8/1971 | Cecce | 280/91 |
| 4,295,657 | 10/1981 | Sano et al. | 280/91 |
| 4,483,547 | 11/1984 | Furukawa et al. | 280/91 |
| 4,582,334 | 4/1986 | Tashiro et al. | 280/91 |

FOREIGN PATENT DOCUMENTS

| 4015 | 4/1954 | Japan . |
| 7358 | 7/1964 | Japan . |
| 15043 | 5/1970 | Japan . |
| 97565 | 6/1983 | Japan | 280/91 |
| 57-272 | 4/1984 | Japan . |
| 216854 | 9/1941 | Switzerland . |

Primary Examiner—John J. Love
Assistant Examiner—Karin L. Ferriter
Attorney, Agent, or Firm—Irving M. Weiner; Joseph P. Carrier; Pamela S. Burt

[57] ABSTRACT

A rider-controlled working machine having a four-wheel steering system including a steering link mechanism operatively interconnecting a steering wheel and front and rear wheels for steering the front and rear wheels simultaneously. The steering link mechanism includes a device for steering the rear wheels such that when the steering wheel is turned through a relatively large angle, the center of turning movement of the working machine is positioned between extensions of the axles of the front and rear wheels at the time the front and rear wheels are in a neutral steering position, and when the steering wheel is turned through a relatively small angle, the center of turning movement of the working machine is positioned between an extension of the transverse axis of an earth working unit coupled to the rear end of the working machine and the extensions of the axles of the rear wheels.

13 Claims, 14 Drawing Sheets

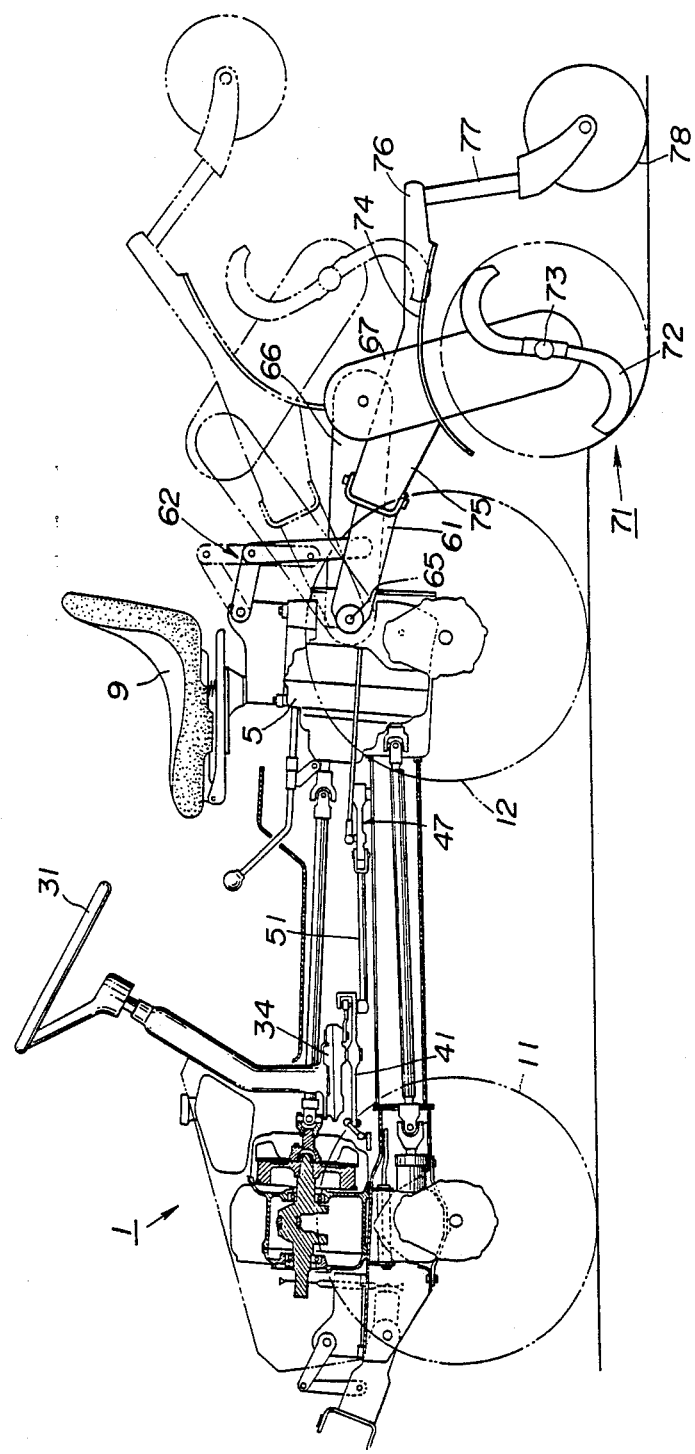

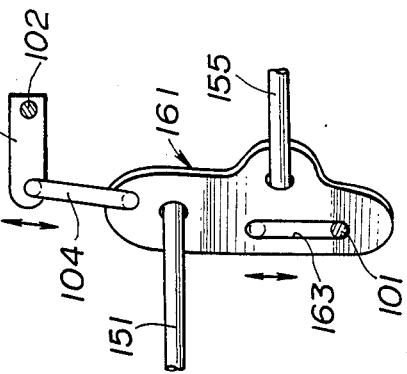
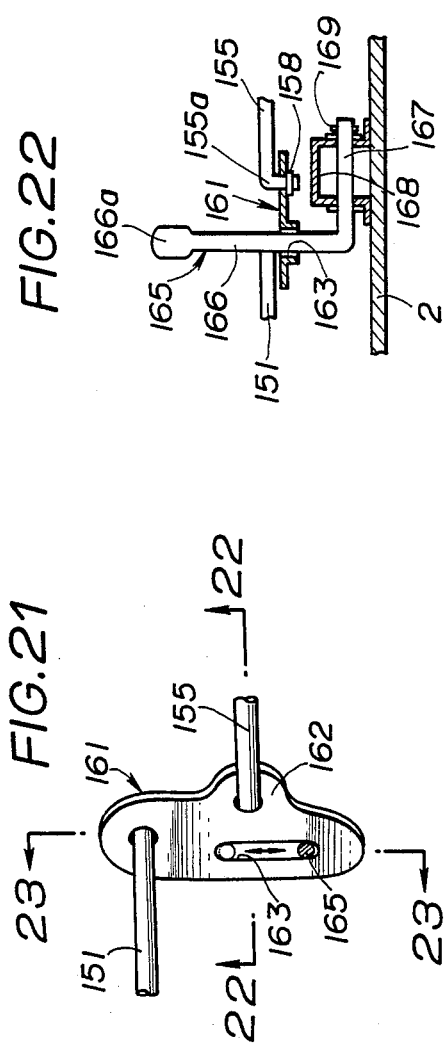
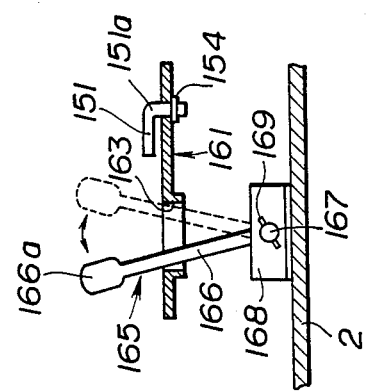

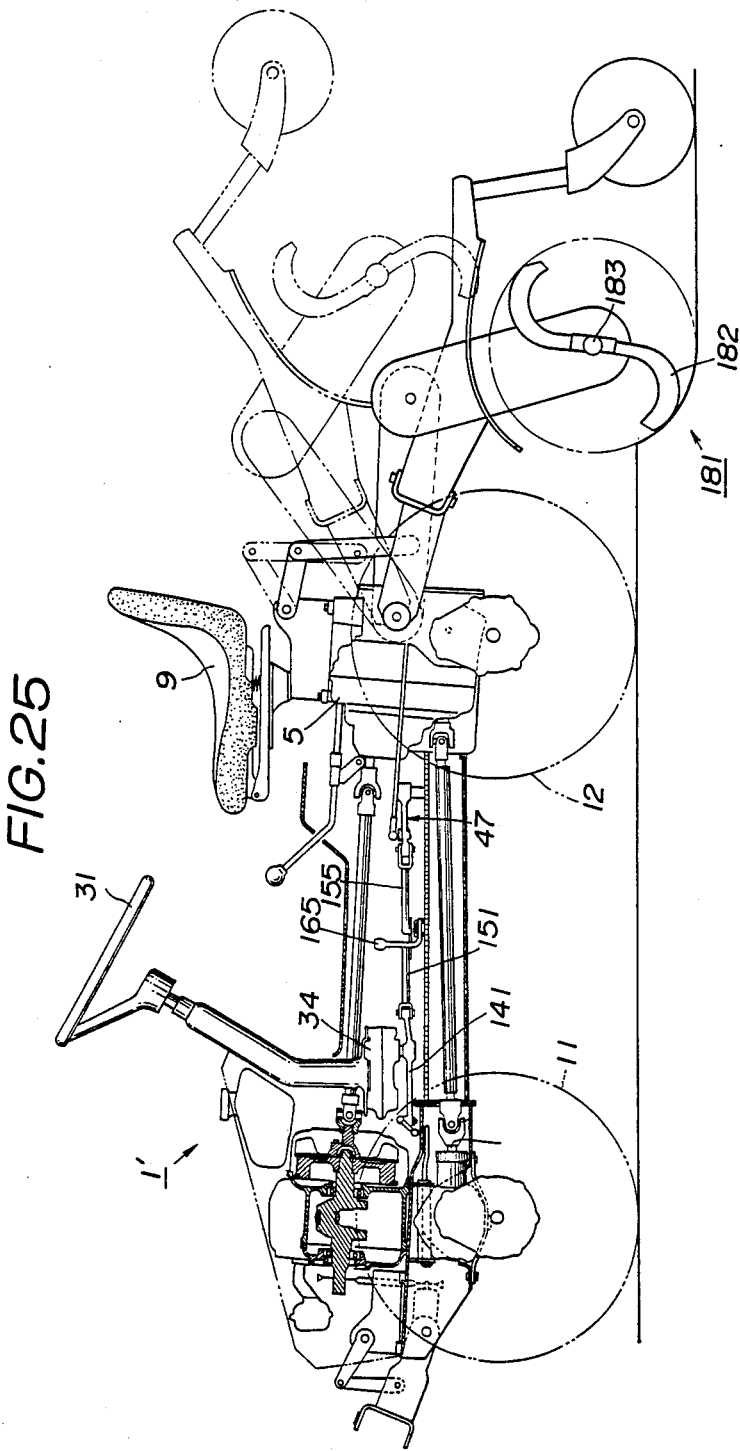

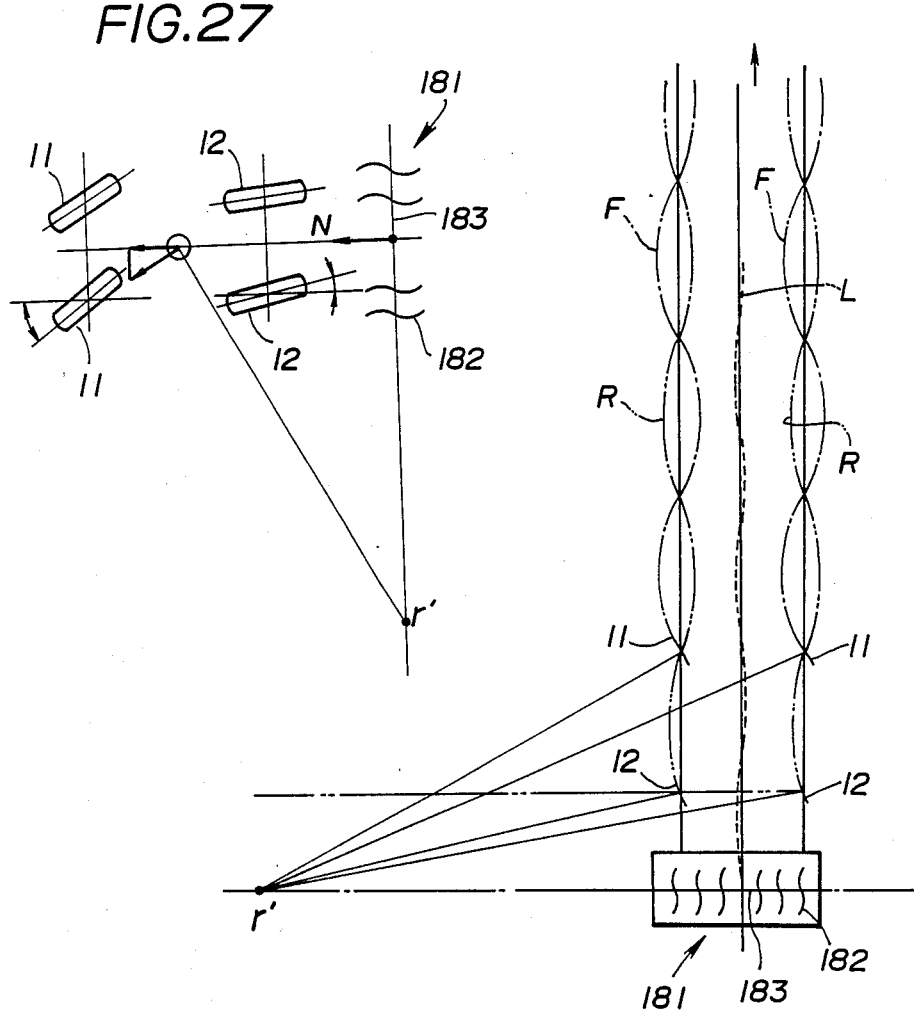

RIDER-CONTROLLED WORKING MACHINE WITH FOUR-WHEEL STEERING SYSTEM

This is a continuation-in-part of application Ser. No. 767,861 filed Aug. 21, 1985, which issued as U.S. Pat. No. 4,613,009 on Sept. 23, 1986, and a continuation of application Ser. No. 811,727, filed Dec. 20, 1985, now abandoned.

BACKGROUND OF THE INVENTION

1. Field of the Invention

The present invention relates to a rider-controlled working machine having a four-wheel steering system.

2. Description of Relevant Art

Rider-controlled working machines such as agricultural working machines or power-driven carts are required to turn with a small radius and hence make small sharp turns. To meet this requirement, it has been proposed to steer the front and rear wheels in opposite directions at the same time as disclosed in Japanese Utility Model Publication No. 29-4015, U.S. Pat. Nos. 1,028,866 and 3,596,730, and Swiss Pat. No. 216,854, for example.

The conventional four-wheel steering systems have linear characteristics such that the rear wheels are steered in the direction opposite to that in which the front wheels are steered even when the steering wheel is turned through a small angle. Since the steered wheels respond sharply to a slight turn of the steering wheel while the vehicle is running along a straight path, it has been difficult to keep the vehicle running straight. The prior rider-controlled agricultural working machines with four-wheel steering systems have therefore failed to cultivate a field along a straight path while pulling over at the edge of a ridge on the field being cultivated or at the step between a cultivated area and an uncultivated area.

Another problem associated with conventional rider-controlled working machines with four-wheel steering system occurs when an earth working unit such as an agricultural rotary working unit is coupled to the rear end of the working machine. When the front and rear wheel of the working machine with such an earth working unit coupled thereto is steered in opposite directions by a small turn of the steering wheel while the working machine is moving along a substantially straight path, the center of turning movement of the working machine is positioned between extensions of the axles of the front and rear wheels in the neutral steering positions. The radius of the turn of the rotary working unit at this time is larger than the radius of the turn of the working machine, with the result that the rotary working unit tends to accumulate soil on one side.

The present invention has been made in an effort to solve the above problems of the conventional rider-controlled working machines with four-wheel steering systems.

SUMMARY OF THE INVENTION

It is an object of the present invention to provide a rider-controlled working machine having a four-wheel steering system with nonlinear rear wheel steering characteristics which cause rear wheels to be steered through a large angle in the direction opposite to that in which front wheels are steered when the steering wheel is turned through a large angle, and which allow the rear wheel to remain substantially unsteered or to be steered in the same direction as that in which the front wheels are steered when the steering wheel is turned through a relatively small angle, so that any transverse movement of an earth working unit coupled to the working machine outwardly of the turning circle of the working machine can be reduced.

To achieve the above object, there is provided a rider-controlled working machine with an earth working unit coupled thereto, comprising a steering wheel, front wheels and rear wheels, the front and rear wheels having respective axles, a steering link mechanism operatively interconnecting the steering wheel and the front and rear wheels for steering the front and rear wheels simultaneously, the steering link mechanism including means for steering those of the front and rear wheels which are closer to the earth working unit so that when the steering wheel is turned through a relatively large angle, the center of turning movement of the working machine is positioned between extensions of the axles of the front and rear wheels at the time the front and rear wheels are in a neutral steering position, and when the steering wheel is turned through a relatively small angle, the center of turning movement of the working machine is positioned between an extension of the transverse axis of the earth working unit and the extensions of the axles of said those wheels.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 15 is a side elevational view, partly in vertical cross section, of the rider-controlled working machine in FIG. 1 with an earth working unit mounted thereon;

FIG. 21 is an enlarged plan view of a changeover mechanism;

FIG. 22 is a cross-sectional view taken along line 22—22 of FIG. 21;

FIG. 23 is a cross-sectional view taken along line 23—23 of FIG. 21;

FIG. 24 is a view similar to FIG. 23, showing a modified changeover mechanism;

FIG. 25 is a side elevational view, partly in vertical cross section of the rider-controlled working machine of FIG. 19 with an earth working unit mounted thereon;

FIG. 26 is a diagrammatic view showing the paths followed by the front and rear wheels and the earth working unit of the working machine of FIG. 19 as it moves substantially along a straight path; and FIG. 27 is a diagrammatic view showing a pattern in which the front and rear wheels are steered one direction.

DETAILED DESCRIPTION OF THE PREFERRED EMBODIMENTS

Figure 1:
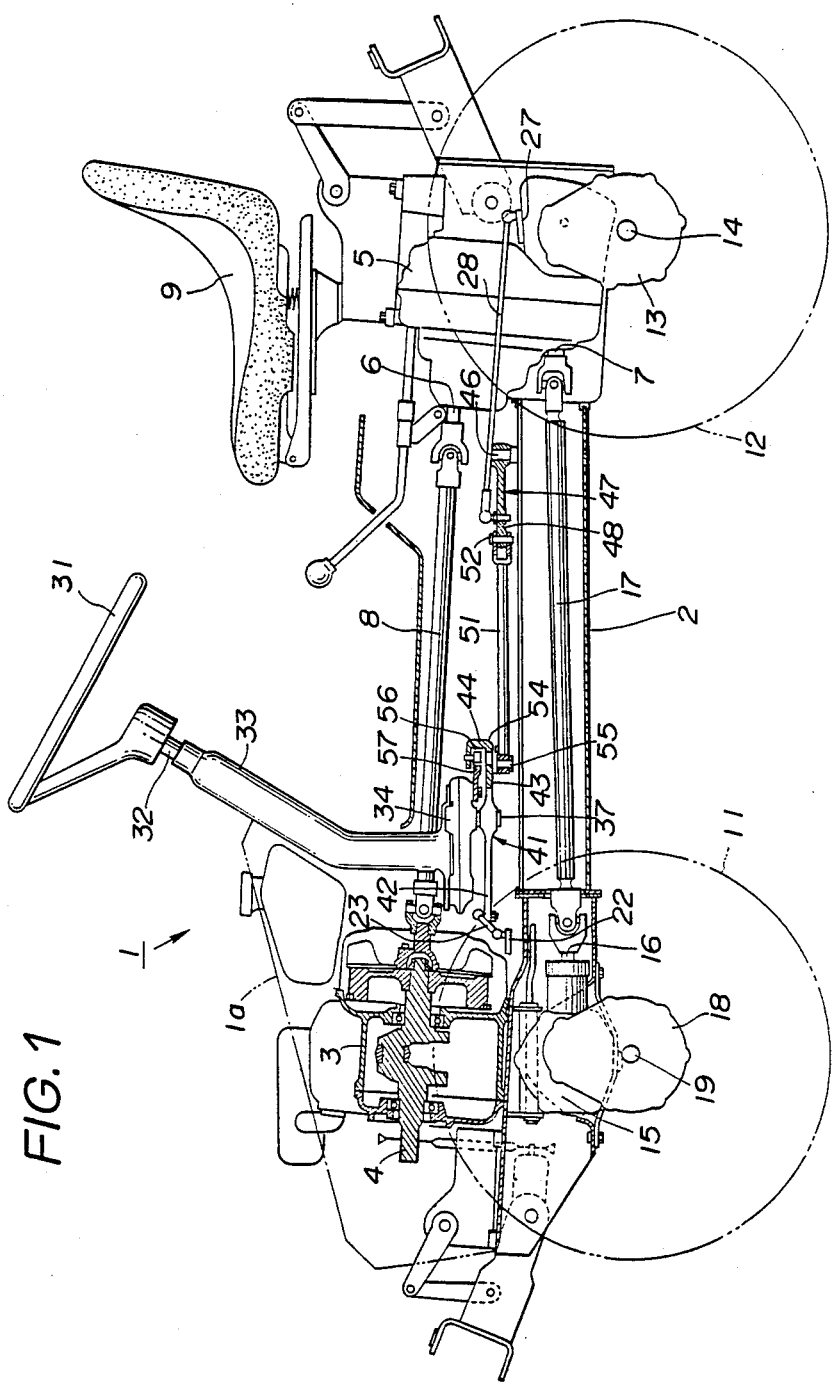
FIG. 1 is a side elevational view, partly in vertical cross section, of a rider-controlled working machine according to an embodiment of the present invention.
Figure 2:
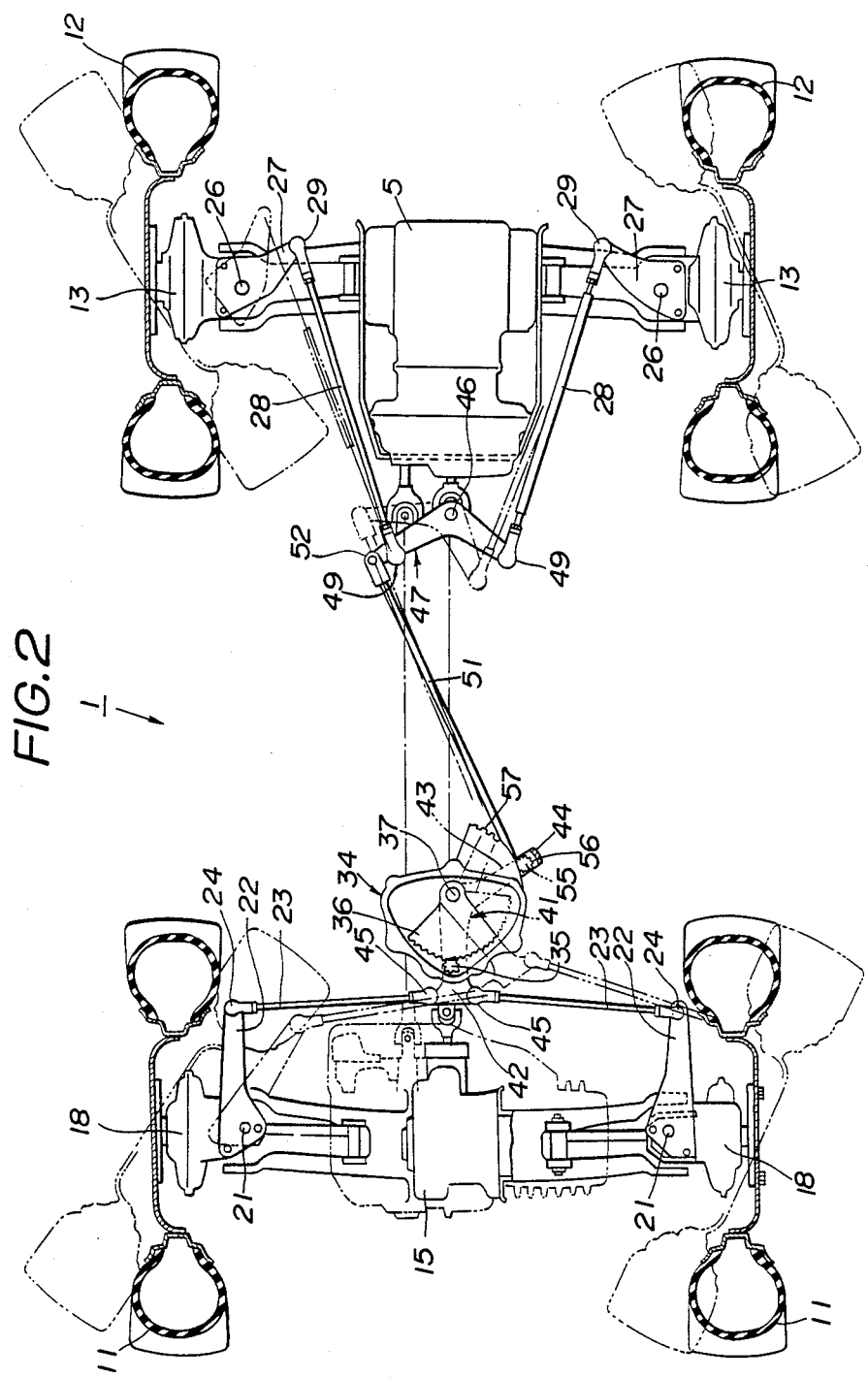
FIG. 2 is a plan view of a four-wheel steering system of the working machine of FIG. 1.

As shown in FIGS. 1 and 2, a rider-controlled vehicle-type working machine 1 includes a vehicle body 1a having a frame 2 disposed in a lower portion thereof centrally in the transverse direction of the working machine 1. The working machine 1 also has an engine 3 installed on a front portion of the frame 2 and having a substantially horizontal crankshaft 4. A transmission case 5 is supported on a rear portion of the frame 2 and has an input shaft 6 coupled to the crankshaft 4 by a propeller shaft 8. A rider's seat 9 is disposed on the rear portion of the vehicle body 1a above the transmission case 5. Two front wheels 11 and two rear wheels 12 are disposed laterally of the vehicle body 1a at front and rear ends, respectively, thereof. The front and rear wheels can be steered by a steering wheel 31, and also can be driven at the same time by the engine 3.

Two speed reducer cases 13 are disposed laterally on opposite sides of the transmission case 5. The speed reducer cases 13 have input shafts (not shown) coupled to the output shafts (not shown) of a differential gear housed in the transmission case 5. The speed reducer cases 13 have output shafts 14 on which the rear wheels 12 are mounted. A differential gear case 15 is disposed below the engine 3 and has an output shaft 16 coupled to a transmission output shaft 7 by a propeller shaft 17. Two speed reducer cases 18 are disposed laterally on opposite sides of the differential gear case 15. The speed reducer cases 18 have input shafts coupled respectively to the output shafts of the differential gear case 15, and output shafts 19 on which the front wheels 11 are mounted. Thus, the rider-controlled vehicle-type working machine 1 has a four-wheel driven system.

The rider-controlled vehicle-type working machine 1 also has a four-wheel steering system as follows: The speed reducer cases 18 on which the front wheels 11 are supported are angularly movable about kingpins 21, respectively, and connected to knuckle arms 22, respectively, extending rearwardly. The knuckle arms 22 are coupled to respective tie rods 23 by ball-and-socket joints 24. The speed reducer cases 13 on which the rear wheels 12 are supported are angularly movable about kingpins 26, respectively, and connected to knuckle arms 27, respectively, extending inwardly. The knuckle arms 27 are coupled to respective tie rods 28 by ball-and-socket joints 29.

The steering wheel 31 has a steering shaft 32 extending through a steering column 33 joined at its lower end to a gear box 34 positioned rearwardly of the engine 3. A pinion 35 is disposed in a front portion of the gear box 34, and is connected to the steering shaft 32 for being rotated thereby. The gear box 34 houses a sector gear 36 meshing with the pinion 35 and joined to a support shaft 37 projecting downwardly out of the gear box 34.

To the projecting portion of the support shaft 37, there is coupled a lever 41 having a substantially bell-crank shape in plan which is fixed to the support shaft 37 at an intermediate angular portion. The lever 41 has a front arm 42 with its opposite sides coupled to the inner ends of the front wheel tie rods 23 by ball-and-socket joints 45, respectively. The lever 41 also includes a rear arm 43 having a cross-sectionally channel-shaped member 44 on its distal end.

A support shaft 46 is mounted on the frame 2 in front of the transmission case 5. An arm 47 having a substantially bell-crank shape in plan is pivotally supported at its intermediate angular portion on the support shaft 46. The arm 47 has laterally extending members coupled at their distal ends to the inner ends of the rear wheel tie rods 28 by ball-and-socket joints 49, respectively.

The support shafts 37, 46 are located on the longitudinal central axis of the vehicle body 1a. One (on the upper side in FIG. 2) of the members of the arm 47 has a projection 48 to which a link 52 is pivotally coupled by a pin 52.

Figure 3:
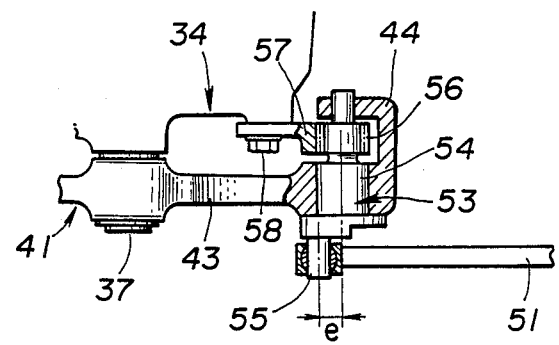
FIG. 3 is an enlarged side elevational view, partly in cross section, of a portion of the four-wheel steering system.
Figure 4:
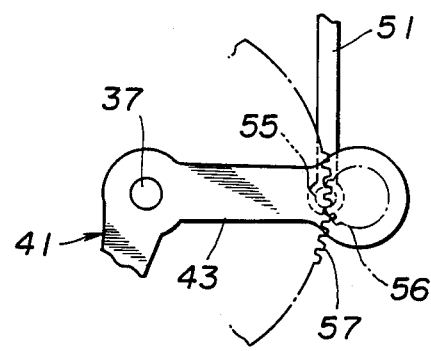
FIG. 4 is an enlarged plan view of the portion shown in FIG. 3.

As illustrated in FIGS. 3 and 4, the link 51 has a front end coupled to the channel-shaped member 44 of the lever 41 by a crankshaft 53 including integral upper and lower crankpins 54, 55, which crankpins have their central axes displaced by a distance e. The front end of the link 51 is pivotally supported on the lower crankpin 55 such that the link 51 crosses the longitudinal central axis of the vehicle body 1a. The upper crankpin 54 extends vertically through the channel-shaped portion 44 and has an integral pinion 56 disposed within the channel-shaped portion 44.

The pinion 56 is held in mesh with an external gear 57 fastened to the lower surface of the gear box 34 by bolts 58. The external gear 57 is in the form of a sector-shaped sun gear having its central axis aligned with the axis of the support shaft 37. The pinion 56 thus serves as a planet pinion revolving on the outer periphery of the sun gear 57 in mesh therewith.

Figure 5:
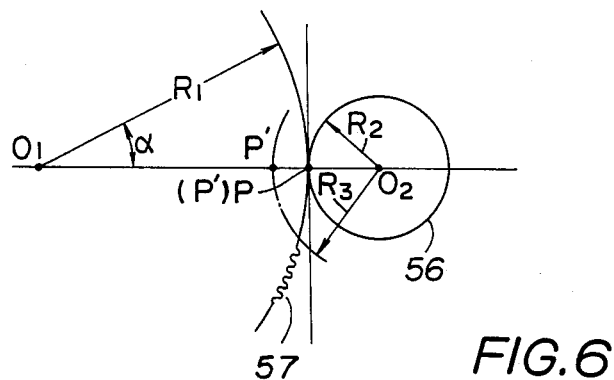
FIG. 5 is a diagrammatic plan view showing the relationship between an external gear and a pinion.

The planet pinion 56 and the sun gear 57 jointly constitute a planetary gear mechanism which cooperates with the crankshaft 53 to define movements of the crankshaft. This planetary gear mechanism and the crankshaft 53 are initialized as follows: As shown in FIG. 5, when the steering wheel 31 is in its neutral position, the center P of the crankpin 55 is positioned on the straight line connecting the center $O_1$ of the sun gear 57 and the center $O_2$ of the planet pinion 56. The sun gear 57 has a reference pitch-circle radius $R_1$, and the pinion 56 has a reference pitch-circle radius $R_2$. The center of the crankpin 55 is spaced a distance $R_3$ from the center $O_2$ of the pinion 56. Denoted at $\alpha$ is an angular displacement of the lever 41 from the neutral steering position.

Figure 6:
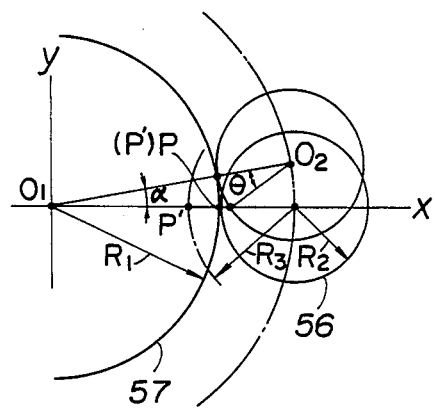
FIG. 6 is a diagrammatic view illustrating the coordinates of the center of a crankpin with respect to the center of the external gear.

FIG. 6 shows an orthogonal coordinate system having its origin aligned with the point $O_1$. From the epicycloidal conditions, $$R_1\alpha = R_2\theta$$

$$\therefore \theta = (R_1/R_2)\alpha \quad \text{(i)}$$

Therefore, the coordinates of the point $O_2$ are given by:

$$x_1 = (R_1 + R_2)\cos\alpha \quad \text{(ii)}$$

$$y_1 = (R_1 + R_2)\sin\alpha \quad \text{(iii)}$$

Figure 7:
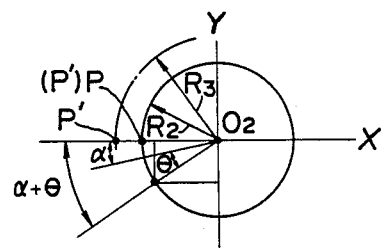
FIG. 7 is a diagrammatic view showing the coordiates of the center of the crankpin with respect to the center of a pinion.

The coordinates of the point P with respect to the point $O_2$ are determined as follows:

If $R_3 = R_2$, i.e., if the point P is on the reference pitch circle of the pinion 56, then the coordinates of the point P are given by:

$$X = -R_2\cos(\alpha + \theta) \quad \text{(iv)}$$

$$Y = -R_2\sin(\alpha + \theta) \quad \text{(v)}$$

as shown in FIG. 7. Since the coordinates of the point P with respect to the point $O_2$ are expressed by $x = x_1 + X$ and $y = y_1 + Y$, $$x = (R_1 + R_2)\cos\alpha - R_2\cos(\alpha + \theta)$$

$$y = (R_1 + R_2)\sin\alpha - R_2\sin(\alpha + \theta)$$

By putting the equation (i) into these equations, $$x = (R_1 + R_2)\cos\alpha - R_2\cos\left\{\left(\frac{R1 + R2}{R2}\right)\alpha\right\} \quad \text{(vi)}$$

$$y = (R_1 + R_2)\sin\alpha - R_2\sin\left\{\left(\frac{R1 + R2}{R2}\right)\alpha\right\} \quad \text{(vii)}$$

The value of y in the equation (vii) is substantially equal to the controlled stroke of the crankpin 55 at the time the lever 41 is angularly moved through the angle $\alpha$.

If the point P is not on the reference pitch circle of the pinion 56, i.e., if the center of the crankpin 55 is at P', then the equations (iv), (v), (vi), and (vii) are modified as follows:

$$X = -R_3\cos(\alpha + \theta) \quad \text{(xiv)}$$

$$Y = -R_3\sin(\alpha + \theta) \quad \text{(xv)}$$

$$x = (R_1 + R_2)\cos\alpha - R_3\cos\left\{\left(\frac{R1 + R2}{R2}\right)\alpha\right\} \quad \text{(xvi)}$$

$$y = (R_1 + R_2)\sin\alpha - R_3\sin\left\{\left(\frac{R1 + R2}{R2}\right)\alpha\right\} \quad \text{(xvii)}$$

Figure 8:
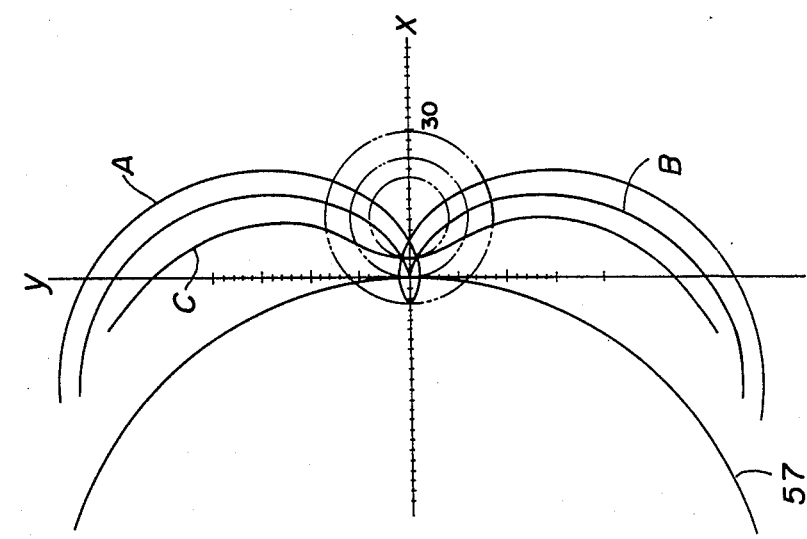
FIG. 8 is a diagram showing epicycloidal curves traced by the center of the crankpin.

The curves traced by the center P or P' of the crankpin 55 are shown in FIG. 8. Where $R_1 = 76.5$, $R_2 = 12$, and $R_3 = 17$, the curve A is followed by the center of the crankpin 55. Where $R_1 = 76.5$, $R_2 - 12$, and $R_3 - 12$, the curve B is followed by the center of the crankpin 55. Where $R_1 = 76.5$, $R_2 = 12$, and $R_3 = 8$, the curve C is followed by the center of the crankpin 55.

Figure 9:
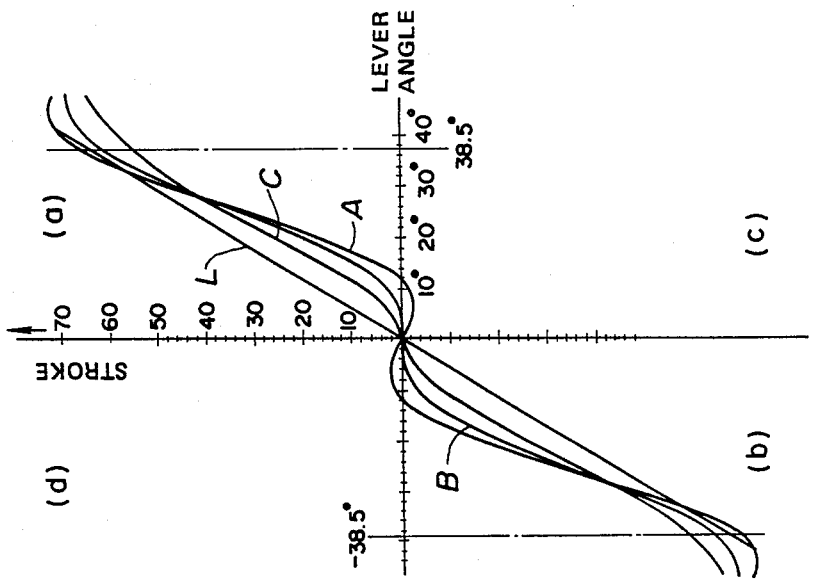
FIG. 9 is a diagram showing the steering characteristic curves of rear wheels steered by the steering system of FIG. 2.

FIG. 9 illustrates steering characteristics of the rear wheels 12 with respect to the traced curves of FIG. 8. In FIG. 9, the angle through which the lever 41 is angularly moved is $\pm 38.5°$, and the linear characteristic curve L represents the steering characteristics of a conventional steering system. The front and rear wheels 11, 12 are steered in opposite directions in the quadrants (a) and (b), and in the same direction in the quadrants (c) and (d).

As can be seen from FIG. 9, if $R_3 > R_2$, i.e., if the center of the crankpin 55 is positioned at P' outside of the reference pitch circle of the pinion 56, the rear wheels 12 can be steered in the same direction as the front wheels 11 when the steering wheel 31 is turned through a small angle. Therefore, the working machine can be moved obliquely to the right or left, so that it can easily be pulled over.

If $R_3 \leq R_2$, i.e., if the center of the crankpin 55 is at P on or within the reference pitch circle of the pinion 56, then the rear wheels 12 are substantially not steered and the working machine can go straight along in the same manner as ordinary vehicles with steerable front wheels when the steering wheel 31 is turned through a small angle.

When the steering wheel 31 is turned through a larger angle, the rear wheels 12 are steered in the direction opposite to that in which the front wheels 11 are steered irrespectively of the position of the center of the crankpin 55. As a consequence, the working machine can make a turn of a small radius and hence can be maneuvered well.

The foregoing embodiment is based on the epicycloidal principles. Another embodiment based on the hypocycloidal principles will be described below.

Figure 10:
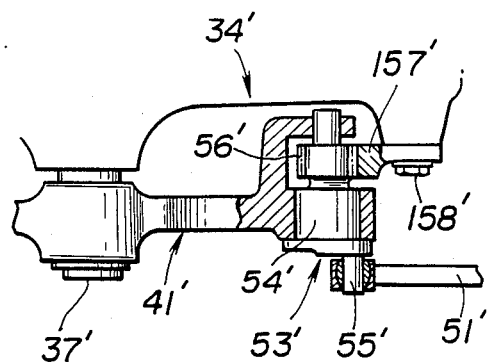
FIG. 10 is an enlarged side elevational view, partly in cross section, of a portion of a modified four-wheel steering system.
Figure 11:
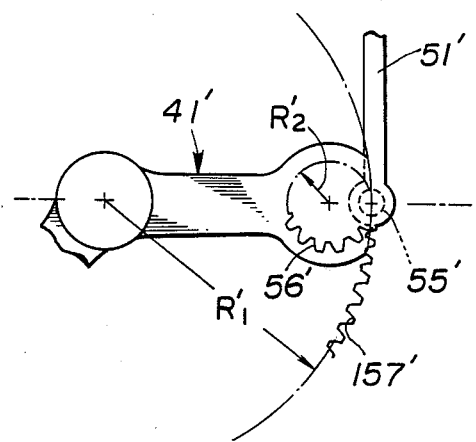
FIG. 11 is an enlarged plan view of the portion shown in FIG. 10.

As shown in FIGS. 10 and 11, an internal gear 157' with which a pinion 56' of a crankshaft 53' meshes is fixed to the lower surface of a gear box 34' by volts 158'. The internal gear 157' is in the form of an arcuate ring gear having its center aligned with the central axis of a support shaft 37'. The pinion 56' thus serves as a planet pinion revolving on the inner periphery of the internal gear 157' in mesh therewith.

The planetary gear mechanism comprising the pinion 56' and the internal gear 157' and the crankshaft 53' are initialized as follows: When the steering wheel is in its neutral position, the center $O'_2$ (FIG. 12) of the planet pinion 56' is positioned on the straight line connecting the center $O'_1$ of the internal gear 157' and the center P'' of a crankpin 55' of the crankshaft 53'. The internal gear 157' has a reference pitch circle having a radius $R'_1$. The pinion 56' has a radius $R'_2$, and the center of the crankpin 55' is spaced a distance $R'_3$ from the center $O'_2$ of the pinion 56'. The steering system according to this embodiment is based on the hypocycloidal principles, and the foregoing equations (i) through (xvii) are effective in this steering system.

Figure 12:
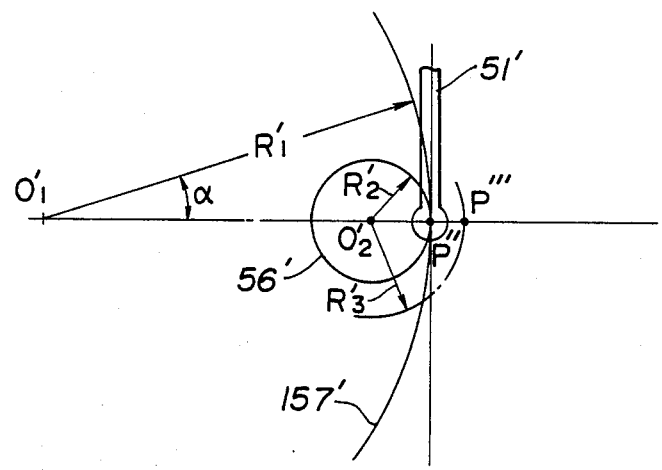
FIG. 12 is a diagrammatic view showing the relationship between an internal gear and a pinion.
Figure 14:
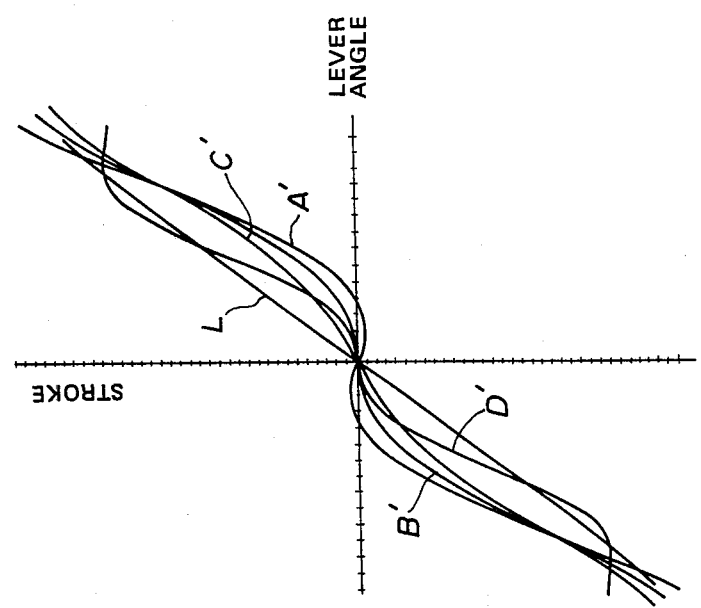
FIG. 14 is a diagram showing the steering characteristic curves of rear wheels steered by the steering system of FIG. 10.
Figure 13:
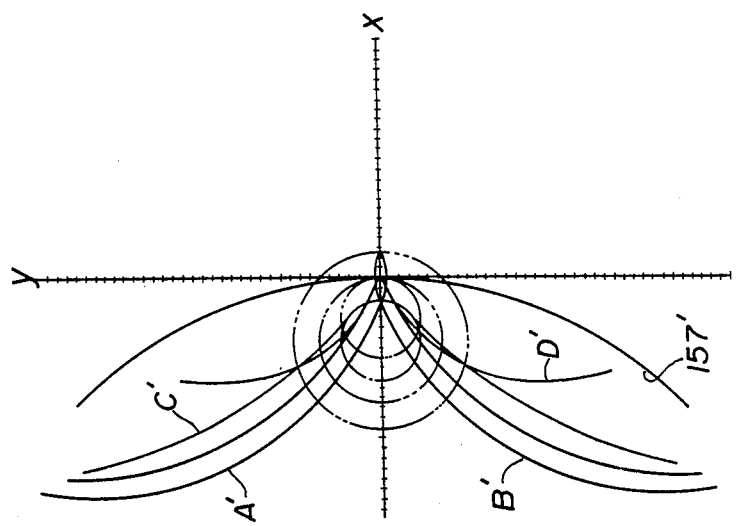
FIG. 13 is a diagram showing hypocycloidal curves traced by the center of a crankpin.

FIG. 13 shows the curves traced by the center of the crankpin 55', and FIG. 14 illustrates the steering characteristics of the rear wheels 12 steered by the steering system shown in FIGS. 10 through 12. The radius $R'_1$ is selected here to be 88.5. The characteristic curves A' in FIGS. 13 and 14 are followed when $R'_2=12$ and $R'_3=17$. The characteristic curves B' are plotted when $R'_2=R'_3=12$. The characteristic curves C' are plotted when $R'_2=12$ and $R'_3=8$. The characteristic curves D' are plotted when $R'_2=R'_3=8$.

Therefore, the present hypocycloidal steering system, like the present epicycloidal steering system of the preceding embodiment, overcomes the problems associated with conventional rider-controlled working machines with four-wheel steering systems.

In the above embodiments, the crankshaft 53, 53' and the planetary gear mechanism 56, 56', 57, 157' are disposed where the lever 41, 41' are operatively coupled to the link 51, 51'. However, the crankshaft 53, 53' and the planetary gear mechanism 56, 56=, 57, 157' may be located where the link 51, 51' is operatively coupled to the arm 47.

The rider-controlled working machine 1 thus incorporates the steering system for the front and rear wheels, wherein the steering system has nonliner steering characteristics for the rear wheels. As shown in FIG. 15, an earth working unit 71 is mounted in overhanging relation on the rear end of the working machine 1.

In the illustrated embodiment, the earth working unit 71 comprises a rotary working unit having a rotary blade 72 coupled to a rotatable shaft 73 and covered by a fender 74. A hitch box 75 extends upwardly and forwardly from the center of the fender 74. A bracket 76 extends rearwardly from the fender 74. A tail wheel 78 is rotatably mounted on the lower end of an arm 77 extending downwardly from the rear end of the bracket 76.

Another hitch box 61 is angularly movably supported on the rear end of the working machine 1 and vertically angularly movable by a lifting device 62. The hitch box 61 is pivotally connected to a power output shaft 65 support on the transmission case 5. The hitch box 75 is connected to the hitch box 61 to hold the rotary working unit 71 in rearwardly overhanging relation to the working machine 1. The power output shaft 65 is operatively coupled to the shaft 73 by transmission means housed in power transmission casings 66, 67.

Figure 16:
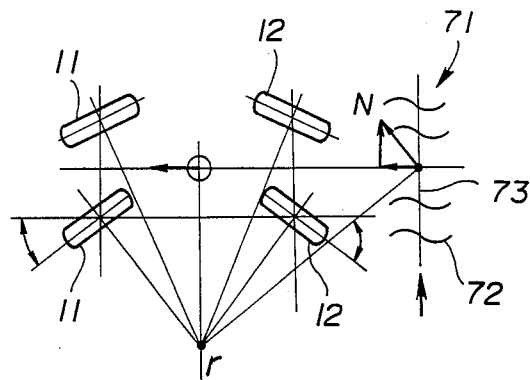
FIG. 16 is a diagrammatic view showing a pattern in which front and rear wheels are steered in opposite directions.

The working machine 1 is employed for agricultural work, for example. When the steering wheel 31 is turned through a relatively large angle, the rear wheels 12 are steered in the direction opposite to that in which the front wheels 11 are steered as shown in FIG. 16, and the working machine 1 can make a small radius turn. The working machine 1 can be turned quickly while preventing slippage.

When the steering wheel 31 is turned through a relatively small angle, the rear wheels 12 are substantially not steered or are steered slightly in the same direction as that in which the front wheels 11 are steered. This allows the working machine 1 to improve its ability to move straight along in the manner described below.

Figure 17:
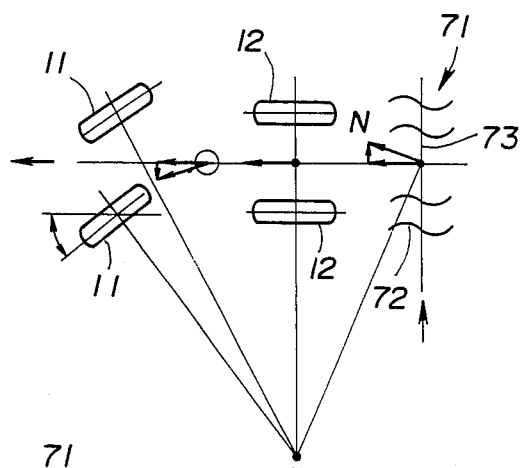
FIG. 17 is a diagrammatic view showing a pattern in which only front wheels are steered.
Figure 18:
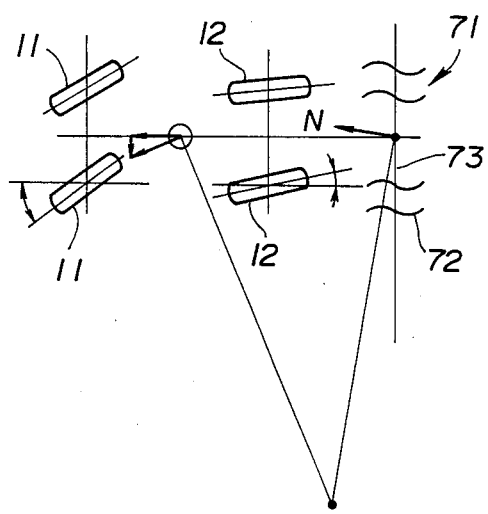
FIG. 18 is a diagrammatic view showing a pattern in which front and rear wheels are steered in one direction.

When the rear wheels 12 are subtantially not steered as shown in FIG. 17 within the small steering angle, the center r of the slight turning movement of the working machine 1 as it moves substantially straight along is on an extension of the rear wheel axles. As a result, a lateral movement N imposed on the rotary working unit 71 outwardly of the turning circle is relatively small, and hence the working machine 1 can relatively easily be maintained in its straight movement in the same manner as ordinary vehicles with steerable front wheels. When the rear wheels 12 are slightly steered in the same direction as that in which the front wheels 11 are steered as shown in FIG. 18, the center r of slightly turning movement of the working machine 1 as it moves substantially straight along approaches an extension of the rotatable shaft 73 of the rotary working unit 71. At this time, the rotary working unit 71 is subjected to substantially no lateral movement N outwardly of the turning circle. The working machine 1 can therefore be moved substantially along a straight path while pulling over at the edge of a ridge on the agricultural field being cultivated or at the step between a cultivated area and an uncultivated area. The rotary working unit 71 is prevented from going along a meandering path while the working machine 1 is moving in this manner.

Since the rotary working unit 71 is prevented from meandering while the working machine 1 is moving substantially along a straight path, it can smoothly cultivate a field while avoiding a localized accumulation of soil.

FIGS. 19 through 26 illustrate a rider-controlled working machine 1' according to another embodiment in which the center of turning movement of the working machine is positioned in the vicinity of an extension of the transverse axis of a working unit coupled to the rear end of the working machine when the steering wheel is turned through a small angle. Those parts in FIGS. 19 through 26 which are identical to those in FIGS. 1 through 9 are denoted by identical reference characters, and will not be described in detail.

Figure 19:
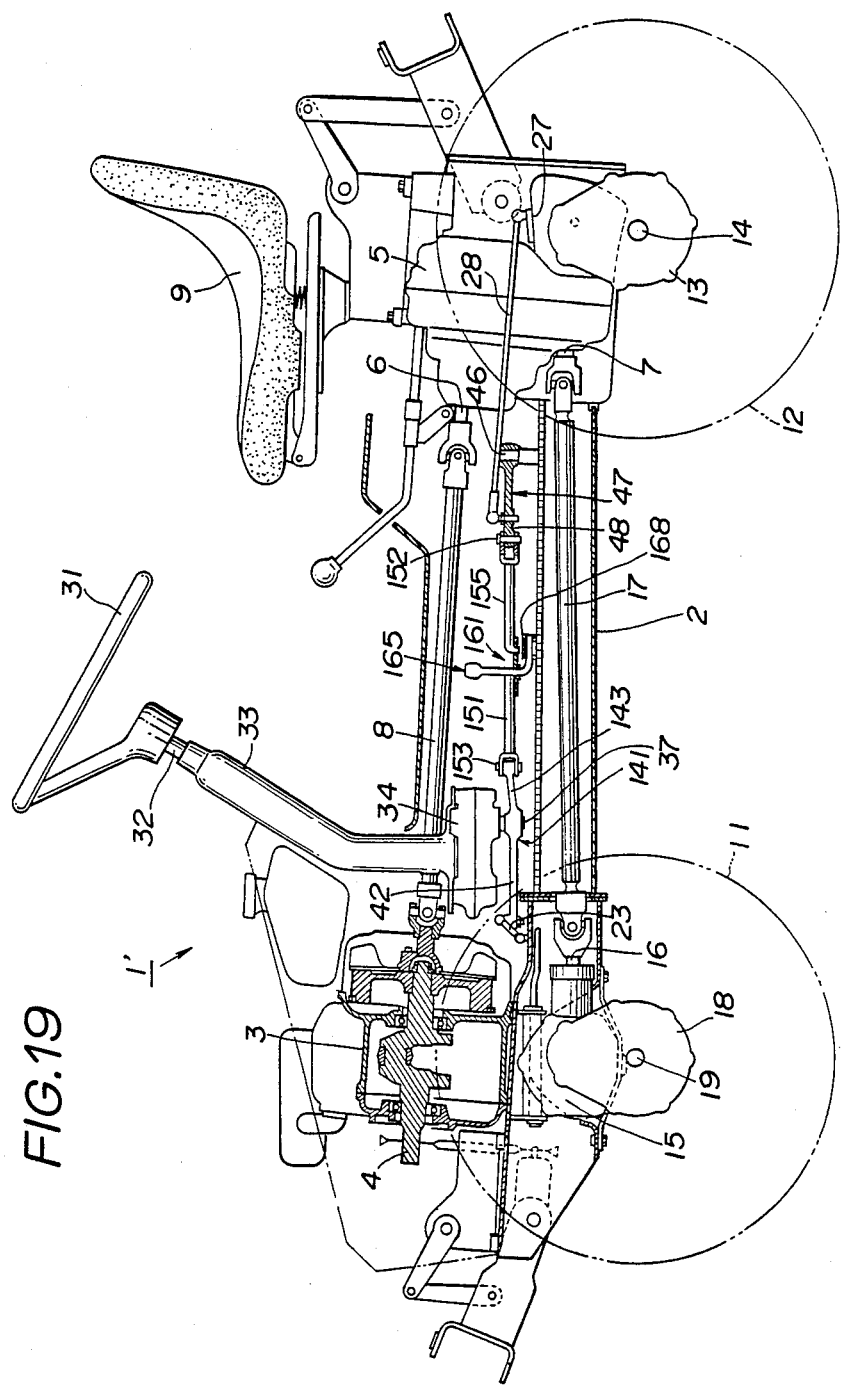
FIG. 19 is a side elevational view, partly in vertical cross section, of a rider-controlled working machine according to another embodiment of the present invention.
Figure 20:
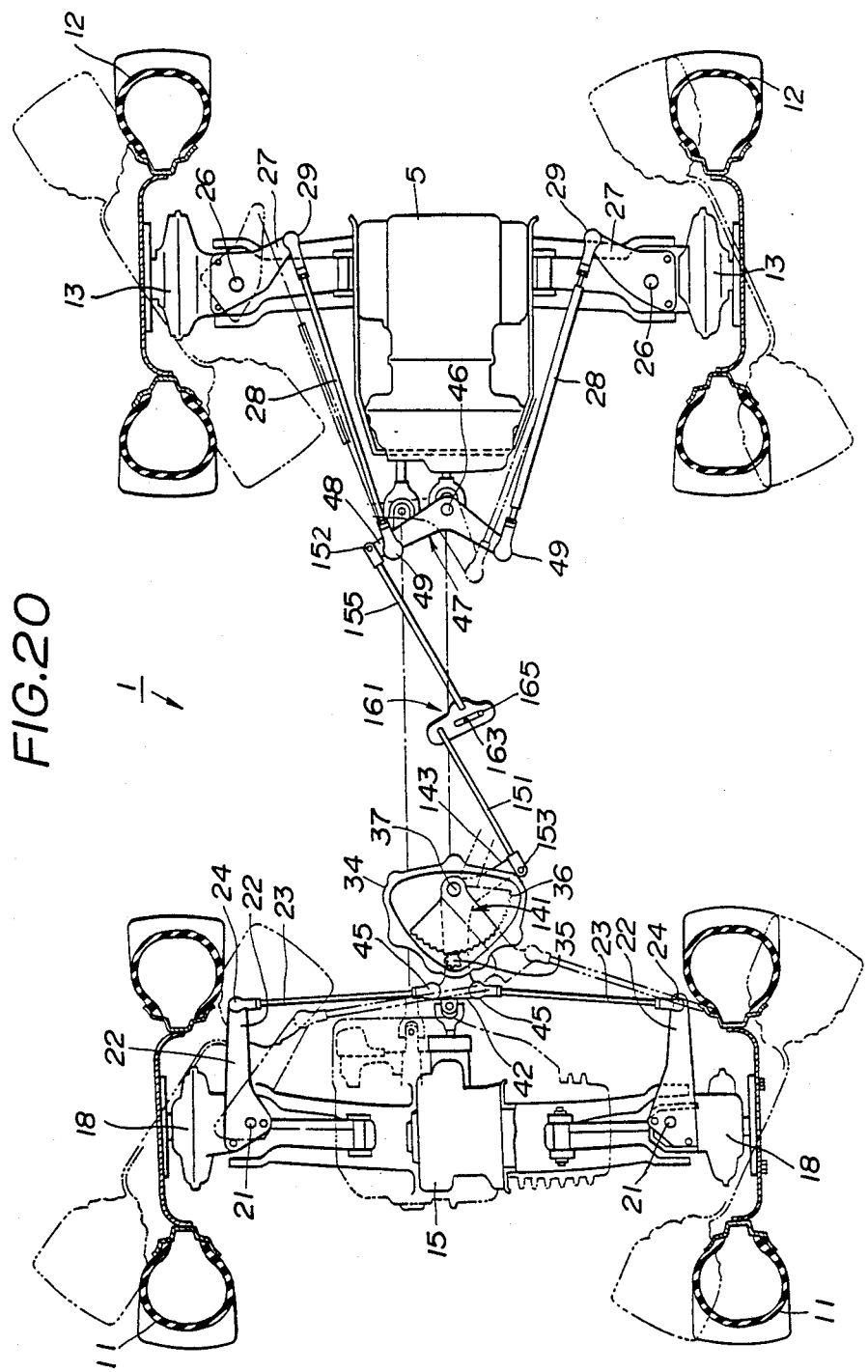
FIG. 20 is a plan view of a four-wheel steering system of the working machine of FIG. 19.

As shown in FIGS. 19 and 20, the support shaft 17 fixed to the sector gear 36 in the gear box 34 on the lower end of the steering column 33 has its lower end projecting out of the gear box 34 and secured to the intermediate angular portion of a bell-crank-shaped lever 141. The lever 141 includes a rear arm 143 having its distal end coupled to the front end of a front link 151 by a pin 153. The bell-crank-shaped arm 47 is pivotally mounted on the support shaft 46 and has its laterally extending members coupled to the rear wheel tie rods 28. One (on the upper side in FIG. 20) of the laterally extending members of the arm 47 is pivotally coupled at its projection 48 to the rear end of a rear link 155 by a pin 152.

As illustrated in FIGS. 21 through 23, the links 151, 155 are pivotally coupled to each other by a changeover plate 161. The changeover plate 161 has its longitudinal axis extending substantially transversely of the vehicle body. The front link 151 has on its rear end a bent pin 151a pivotally coupled to one end of the changeover plate 161. The changeover plate 161 has an intermediate, rearwardly bulging portion 162 to which there is pivotally coupled a bent pin 155a on the front end of the rear link 155. The bent pins 151a, 155a are retained in position on the changeover plate 161 by means of retaining rings 154, 158, respectively.

The lever 141 and the arm 47 are thus operatively coupled to each other through the front and rear links 151, 155 and the changeover plate 161 which serves as an intermediate link.

The changeover plate 161 has a longitudinal slot 163 defined adjacent to and extending across the bent pin 155a on the bulging portion 162.

A changeover lever 165 is mounted on the frame 2 and extends through the slot 163. The changeover lever 165 is substantially L-shaped in side elevation as shown in FIG. 22, and includes a grip 166a on the upper and of a vertical rod 166 extending upwardly from the changeover plate 161. The changeover lever 165 also has a horizontal rod 167 extending through and pivotally supported on a channel-shaped bracket 168 fixed to the frame 2. The horizontal rod 167 is retained on the bracket 168 by a retaining pin 169.

With the changeover lever 165 fixedly held against one end of the slot 163 by a suitable means, the changeover lever 165 can swing about the vertical rod 167 when the links 151, 155 are moved. By shifting the lever 165 in the slot 163, the point about which the changeover plate 161 can swing is positionally varied. Dependent on whether the lever 165 is positioned on one side or the other of the bent pin 155a of the rear link 155, the rear link 155 can be moved in the same direction as or in the direction opposite to the direction in which the front link 151 is moved. Hence, the rear wheels 12 can be steered in the same direction as or in the direction opposite to that in which the front wheel 11 are steered.

Consequently, the rear wheels 12 can be steered in a desired direction simply by controlling the changeover lever 165.

The changeover arrangement shown in FIGS. 19 through 23 is simple, made up of a small number of parts, and does not take up a large installation space, as it merely requires the changeover plate 161 and the changeover lever 165.

In the illustrated embodiment, the changeover lever 165 is manually operated. However, an arrangement can be added to automatically operate the changeover lever 165 as through the depression of a pushbutton switch.

As shown in FIG. 25, an earth working unit 181 is mounted in overhanging relation on the rear end of the rider-controlled working machine 1'.

In operation, the changeover lever 165 is shifted toward the end of the slot 163 closer to the front link 151 so that the rear wheels 12 can be steered in the same direction as that in which the front wheels 11 are steered. When the working machine 1' is operated for agricultural work, the rear wheels 12 are slightly steered in the same direction as that in which the front wheel 11 are steered, as shown in FIG. 27, in a small steering angle through which the steering wheel 31 is turned. The center r' of slightly turning movement of the working machine 1' as it moves substantially straight along approaches an extension of the rotatable shaft 183 of the rotary working unit 181. At this time, the rotary working unit 181 is subjected to substantially no lateral movement N outwardly of the turning circle. The working machine 1' can therefore be moved substantially along a straight path while pulling over at the edge of a ridge on the agricultural field being cultivated or at the step between a cultivated area and an uncultivated area. The rotary working unit 181 is prevented from going along a meandering path while the working machine 1' is moving in this manner.

Since the rotary working unit 181 is prevented from meandering while the working machine 1' is moving substantially along a straight path, it can smoothly cultivate a field while avoiding a localized accumulation of soil.

FIG. 26 shows paths traced by the front and rear wheels when the center r' of turning movement of the working machine 1' as it moves substantially along a straight path is on the extension of the rotatable shaft 183. More specifically, when the steering wheel 31 is turned through a small steering angle in order to position the center r' on the extension of the rotatable shaft 183 in a small steering angle, meandering paths F of the front wheels 11 and meandering paths R of the rear wheels 12 are produced in an alternating pattern. Regardless of these meandering paths F, R, the center of the rotary working unit 181 which is aligned with the longitudinal axis of the working machine 1' follows a substantially central line L along the direction in which the working machine 1' moves.

Since the rotary working unit 181 can be maintained in a substantially straight path even when the working machine 1' is driven along a slightly tortuous path, therefore, the rotary working unit 181 undergoes no lateral movement or a negligible amount of lateral movement, and hence can cultivate a field along a straight path while preventing soil from being locally accumulated.

FIG. 24 shows a modification in which a support shaft 101 fixed to the frame 2 is disposed in the slot 163 in the changeover plate 161. A changeover lever 103 is pivotally supported by another support shaft 102 and also pivotally coupled to the plate 161 by a rod 104.

The steering systems for the front and rear wheels according to the present invention can be incorporated not only in rider-controlled working machines, but in ordinary motor vehicles such as passenger cars.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A rider-controlled working machine with an earth working unit coupled thereto, comprising:

a steering wheel;

front wheels and rear wheels, said front and rear wheels having respective axles and said axles having longitudinal axes extending transversely of said working machine;

a steering link mechanism operatively interconnecting said steering wheel and said front wheel and rear wheels for steering the front and rear wheels simultaneously such that said rear wheels are steered in a direction opposite to that in which front wheels are steered when the steering wheel is turned through a relatively large angle, and said rear wheels are either not steered or steered in the same direction as that in which the front wheels are steered once said steering wheel is turned through a relatively small angle;

said steering link mechanism including steering means for steering those of said front and rear wheels which are closer to the earth working unit so that when said steering wheel is turned through the relatively large angle, the center of turning movement of the working machine is positioned between said longitudinal axes of the axles of said front and rear wheels, and when said steering wheel is turned through the relatively small angle, the center of turning movement of the working machine is positioned between an extension of a transverse axis of said earth working unit and the longitudinal axis of said axis of said those wheels, whereby said earth working unit is prevented from meandering while said working machine is moving substantially along a straight path; and said steering means comprising a crankshaft having an eccentric first pivot portion and a second pivot portion operatively coupled to said those wheels and the other wheels, respectively, and a planetary gear mechanism cooperating with said crankshaft to define movements of the crankshaft.

2. A rider-controlled working machine according to claim 1, wherein said steering means comprises means for steering said those wheels so that when said steering wheel is turned through the relatively small angle, said center of turning movement is positioned in the vicinity of said transverse axis of the earth working unit.

3. A rider-controlled working machine according to claim 2, wherein said earth working unit has a rotatable shaft aligned with said center of turning movement when said steering wheel is turned through the relatively small angle.

4. A rider-controlled working machine with an earth working unit coupled thereto, comprising:
a vehicle body;
a steering wheel;
front wheels and rear wheels, said front wheels and rear wheels having respective axles and said axles having longitudinal axes extending transversely of said working machine;
a steering like mechanism operatively interconnecting said steering wheel and said front and rear wheels for steering the front and rear wheels simultaneously;
said steering link mechanism including steering means for steering those of said front and rear wheels which are closer to the earth working unit so that when said steering wheel is turned through a relatively large angle, the center of turning movement of the working machine is positioned between said longitudinal axes of the axles of said front and rear wheels, and when said steering wheel is turned through a relatively small angle, the center of turning movement of the working machine is positioned between an extension of a transverse axis of said earth working unit and the longitudinal axis of said axle of said those wheels, whereby said earth working unit is prevented from meandering while said working machine is moving substantially along a straight path; and
said steering link mechanism comprising a member fixedly connected to said vehicle body, a pair of first tie rods for steering said front wheels, a pair of second tie rods for steering said rear wheels, a lever operatively coupled to said first tie rods and angularly movable with respect to said vehicle body in response to turning movement of said steering wheel, an arm operatively coupled to said second tie rods and angularly movable with respect to said vehicle body, and a link operatively interconnecting said lever and said arm, said lever and said arm constituting companion members operatively coupled to said link, said steering means comprising a crankshaft inserted in one end of said link and one end of one of said companion members, said crankshaft having an eccentric first pivot portion to which said link is pivotally connected and a second pivot portion to which said companion member is pivotally connected, and a planetary gear mechanism operatively interposed between said second pivot portion and said fixed member.

5. A rider-controlled working machine according to claim 4, wherien said planetary gear mechanism comprises a pinion rotatably mounted on said second pivot portion and teeth fixed to said fixed member and held in mesh with said pinion, said teeth being in the form of an arcuate gear having its rotational axis aligned with the center of angular movement of said companion member.

6. A rider-controlled working machine according to claim 5, wherein said arcuate gear comprises an external gear.

7. A rider-controlled working machine according to claim 5, wherein said arcuate gear comprises an internal gear.

8. A rider-controlled working machine according to claim 5, wherein said first pivot portion has a central axis positioned outside of the reference pitch circle of said pinion.

9. A rider-controlled working machine according to claim 8, wherein said arcuate gear comprises an external gear; and the central axis of said pinion, said center of the arcuate gear, and said central axis of said first pivot portion being relatively positioned such that when said steering wheel is in its neutral steering position said center of said first pivot portion is positioned on a straight line connecting said central axis of said pinion and said center of said external gear.

10. A rider-controlled working machine according to claim 8, wherein said arcuate gear comprises an internal gear; and the central axis of said pinion, said center of the arcuate gear, and said central axis of said first pivot portion being relatively positioned such that when said steering wheel is in its neutral steering position said central axis of said pinion is positioned on a straight line connecting said central axis of said first pivot portion and said center of said internal gear.

11. A rider-controlled working machine according to claim 5, wherein said first pivot portion has a central axis positioned within the reference pitch circle of said pinion, including the reference pitch circle itself.

12. A rider-controlled working machine according to claim 11, wherein said arcuate gear comprises an external gear; and the central axis of said pinion, said center of the arcuate gear, and said central axis of said first pivot portion being relatively positioned such that when said steering wheel is in its neutral steering position said center of said first pivot portion is positioned on a straight line connecting said central axis of said pinion and said center of said external gear.

13. A rider-controlled working machine according to claim 11, wherein said arcuate gear comprises an internal gear; and the central axis of said pinion, said center of the arcuate gear, and said central axis of said first pivot portion being relatively positioned such that when said steering wheel is in its neutral steering position said central axis of said pinion is positioned on a straight line connecting said central axis of said first pivot portion and said center of said internal gear.

* * * * *

UNITED STATES PATENT AND TRADEMARK OFFICE
CERTIFICATE OF CORRECTION

PATENT NO. : 4,798,393

DATED : January 17, 1989

INVENTOR(S) : Miura et al.

It is certified that error appears in the above-identified patent and that said Letters Patent is hereby corrected as shown below:

```
Column 1, line 41, change "system" to --systems--.
Column 2, line 46 and 47, change "coordiates" to --coordinates--.
          line 49 and 50, change "coordiates" to --coordinates--.
Column 4, line 43, change "52" to --51--.
Column 5, lines 7 and 8, change "anglular" to --angular--.
Column 6, line 4, change "-" (both occurrences) to --=--.
Column 7, line 15, change "56=" to --56'--;
          line 20, change "nonliner" to --nonlinear--;
          line 38, change "support" to --supported--.
Column 8, line 30, change "17" to --37--;
          line 66, after "upper" change "and" to --end--.
Column 9, line 7, change "lever 165" to --plate 161--; change "167" to --166--;
          line 17, change "wheel" to --wheels--;
          line 41, change "wheel" to --wheels--.
Column 10, line 67, change "axis" (second occurrence) to --axle--.
Column 12, line 6 (Claim 5, line 2), correct the spelling of "wherein";
          line 10 (Claim 5, line 6), change "rotational axis" to --center--;
          line 11 (Claim 5, line 7), change "center" to --rotational axis--.
```

Signed and Sealed this

Twenty-sixth Day of December, 1989

Attest:

JEFFREY M. SAMUELS

Attesting Officer      Acting Commissioner of Patents and Trademarks